Patented Jan. 2, 1951

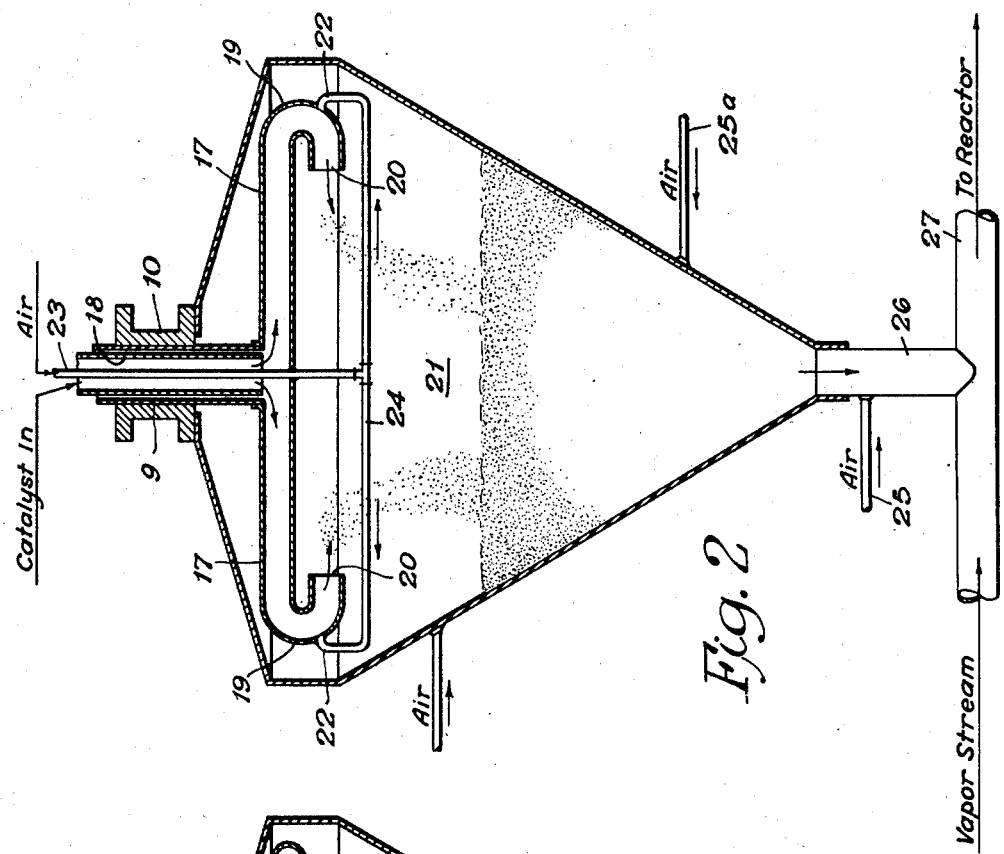
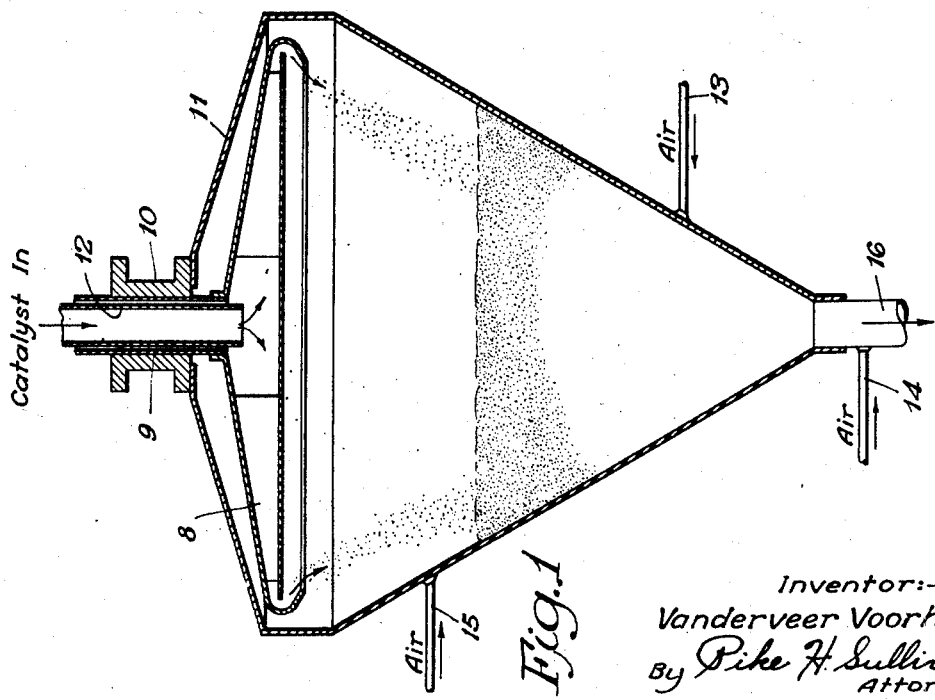

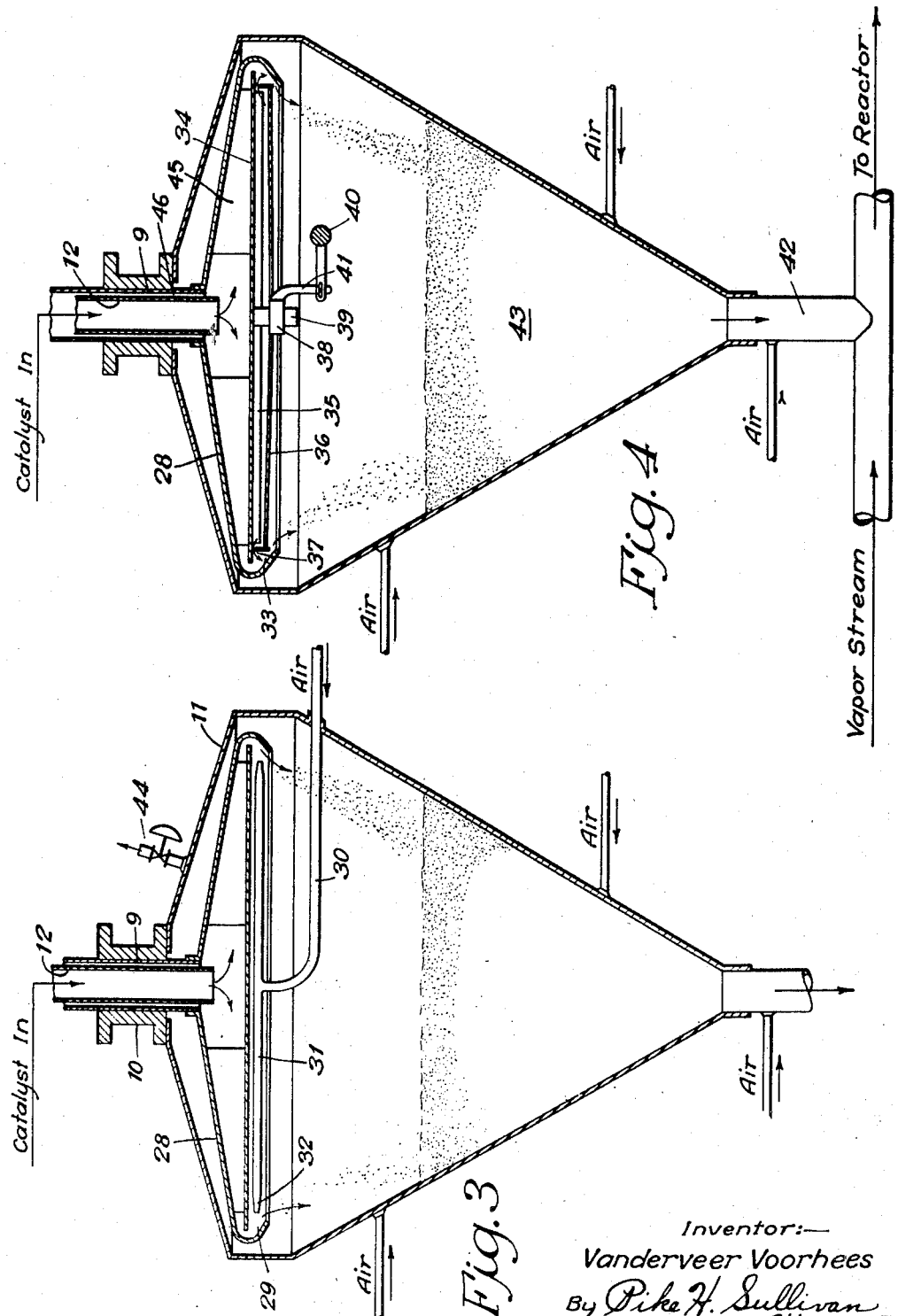

2,536,402

UNITED STATES PATENT OFFICE 2,536,402

FLUIDIZED SOLIDS TRANSFER

Vanderveer Voorhees, Homewood, Ill., assignor to Standard Oil Company, Chicago, Ill., a corporation of Indiana Application October 13, 1945, Serial No. 622,229

7 Claims. (Cl. 302—36)

This invention relates to a method and apparatus for transferring powdered solids from a region of one pressure to a region of higher pressure. It relates particularly to a pump for transferring finely divided solids in aerated fluidized condition in a closed system against a substantial back pressure. One object of the invention is to transfer fluidized solids such as powdered catalysts by means of a compact apparatus against a substantial back pressure, without difficulty from erosion, abrasion or attrition.

In conducting catalytic reactions it is often desirable to operate the catalytic reaction chamber at substantial pressures of the order of 50 p. s. i. to 500 p. s. i. In processes of hydroforming hydrocarbons, naphtha, etc., it is frequently desirable to operate at pressures of 100 to 400 p. s. i. in the presence of hydrogen. Heretofore it has been necessary to conduct these processes with fixed bed catalysts. An object of my invention is to provide a pump for charging finely divided catalysts to reactions of this kind and thereby obtain the advantages of fluidized catalyst operation, advantages such as continuous operation and uniform temperature control.

Another object of my invention is to provide a pump for transferring powdered solids against substantial pressure which will have a high capacity for a relatively small unit size and which will be thoroughly reliable and continuous in action and easily controllable with respect to starting, stopping and throughput. This application is a continuation-in-part of my application Serial 596,583, filed May 29, 1945, now Patent No. 2,495,152, issued January 17, 1950.

The invention is illustrated by drawings in which

Figure 1 shows the body and impeller of a suitable design of powdered solids pump but without means for controlling the flow of solids thru the pump;

Figure 2 illustrates a similar body design but with a different type of rotating element or "bowl" provided with pneumatic flow-control means;

Figures 3 and 4 illustrate pumps with the same bowl construction as in Figure 1 but equipped with different arrangements of pneumatic means for controlling the flow of solids from the periphery of the bowl.

The problem of transferring fluidized solids such as wheat flour, cornstarch, Portland cement, powdered lime, powdered coal, and powdered catalysts typified by Super Filtrol clays, synthetic hydrocarbon conversion catalysts such as silica-alumina, molybdenum oxide on alumina, micro-spherical silica gel, etc., presents numerous difficulties not encountered in the transfer of true liquids and gases. Thus, although the finely divided solids may be fluidized by aeration and conveyed thru pipes much in the same way as is done with liquids, these fluidized streams are substantially impossible to pump with the usual pumping equipment employed for liquids, for the reason that deaeration may occur at any time, for example by shutting down or under the influence of centrifugal and gravitational forces, thereby causing the fluidized solids to collect as an immobile mass in the apparatus. Furthermore, the handling of such fluidized solids in centrifugal equipment such as the ordinary centrifugal pump where the bowl is moving at high velocity commonly results in severe erosion of the moving parts. In the case of screw-type and plunger-type pumps, abrasion results from the impossibility of lubrication and the abrasive character of most of the fluidized solids being handled.

Previous attempts to handle fluidized solids in centrifugal pumps have not been successful for these reasons. Thus, in U. S. Patent 1,937,040 a centrifugal pump design is described employing flow-control means subject to extreme abrasive action resulting in high upkeep costs, non-uniform operations, and damage to the granular structure of the fluidized solids being handled. According to my invention, the solids are transferred against higher pressure by centrifugal action using an entirely new principle wherein the fluidized solids are substantially deaerated and compacted in the rotating member or bowl of the pump and then reaerated at the periphery of the bowl to restore their fluid characteristics and allow them to flow from the bowl, the rate of flow being controllable by the manner and extent of reaeration. As a result the pump I have provided may be used for transferring solids in one or more stages from low pressures to high pressures. The action is dependable and continuous and easily controlled with respect to throughput. The invention will be better understood by referring to the drawings.

In Figure 1, rotating element 8 carried on shaft 9 running in bearing 10 is positioned within pump housing 11. Induction tube 12 for catalyst or other powdered solids extends thru hollow shaft 9 into the central portion of the bowl 8. Solids are permitted to accumulate in the lower part of pump case 11 and are maintained fluidized by the introduction of aeration gas such as air at 13 and 14. Additional gas may be injected at 15 to maintain the pressure within case 11 at the desired point for expelling fluidized solids from the outlet 16. This drawing shows no means for controlling the flow of solids from the periphery of the rotating bowl 8. It is therefore substantially inoperative, or only critically operative. If the supply of solids to the pump thru induction tube 12 is maintained uninterrupted, and if the pressure differential within the pump is relatively low there is a critical condition at which the pump may be made to function, the solids remaining aerated and fluid within the bowl 8. Deaeration, is very likely to take place within the bowl, however, with the result that the bowl rapidly becomes filled or "plugged" with deaerated solids packed tightly therein and incapable of transmitting pressure to the outlet of the bowl and escaping therefrom.

The critical operating characteristic is overcome by the design shown in Figure 2, wherein the "bowl" consists of one or more pairs of dynamically balanced legs 17 arranged as the spokes of a wheel. These may be constructed of short pipes with return bends at the periphery, the inner ends being welded into a hollow hub into which the catalyst or other fluidized solids is admitted by induction tube 18. From the hub the catalyst is thrown outwardly by the centrifugal action of the rapidly whirling assembly or wheel and the catalyst accumulates in the return bends 19 where it is deaerated, effectively preventing flow of catalyst thru the return bend to the outlet 20 thereof, as a result of the substantial impossibility of transmitting fluid pressure from the leg 17 to the outlet 20 facing radially inward. This condition forms an effective seal against back pressure within the chamber 21. Furthermore the rotating leg 17, filled with compacted solids, exerts sufficient centrifugal force in the direction of outlet 20 to more than balance the pressure in housing 21, the density of the compacted catalyst, the length of leg 17, and the speed of rotation being designed sufficient to more than overcome the pressure for which the pump is employed.

In order to induce catalyst flow thru the apparatus and regulate it, there is provided at the bottom of each return bend 19 a gas inlet 22 supplied by gas, e. g. air introduced thru line 23 and distributor 24. The injection of air or gas at points 22 effects the aeration of the solids in the return bends 19, thereby removing the catalyst block therein and permitting the flow of catalyst thru legs 17, when the catalyst in the legs 17 is no longer supported by the block of catalyst in return bends 19. Rate of flow may be increased or decreased by regulating the rate of air introduction in line 23. The fluidized catalyst leaving outlets 20 accumulates in fluidized condition in the bottom of chamber 21 where it is maintained fluidized by additional aeration gas introduced by lines 25 and 25a. The fluidized catalyst is withdrawn thru outlet 26 where it may join a stream of vapor or liquid flowing thru line 27.

One of the characteristics of this centrifugal pump design for powdered solids is the stationary induction tube 18 leading the fluidized catalyst into the bowl. An annular space surrounding the induction tube within the hollow shaft 9 permits the egress of gas separated from the solids in the bowl without blocking of the inlet. Furthermore, by maintaining the induction tube 18 stationary, there is no centrifugal deaeration action exerted upon the catalyst stream until after it has entered the bowl.

Referring now to Figure 3, aeration and refluidizing of the compact catalyst massed in the periphery of bowl 28 is effected by directing one or more blasts or jets of air against the surface of the compacted catalyst accumulated in channel 29. For this purpose, air or other gas is introduced by line 30 leading to distributor 31. Nozzle 32 directs the air against the catalyst which normally prevents the flow of catalyst thru the pump and escape of gas backward thru the impeller.

Figure 4 illustrates an apparatus which embodies the same principle as that in Figure 3 with respect to the application of a gas stream to the surface of the catalyst in channel 33. However, in the design shown in Figure 4, the gas which impinges upon the surface of the catalyst is derived from the rotation of the bowl itself in the following manner: The bottom of the bowl, comprised of plate 34, is equipped with fins or vanes 35. The movement of air across the surface of the plate under the influence of the rapidly rotating fins is confined by baffle plate 36 which is a circular plate corresponding substantially in diameter to the bowl. At the periphery of plate 36 a rim 37 acts as a loose seal against the bottom of the bowl when the plate 36 is moved in an upward direction. The position of the plate is controlled by bearing 38 vertically slidable on shaft 39 by the action of control shaft 40 and arm 41. The shaft 40 passes thru a packing gland, not shown, in the wall of the pump chamber to an external handwheel, crank, or other controlling device, not shown. Opening of the peripheral orifices by lowering plate 36 results in a strong draft or blast of gases against the surface of the compacted catalyst in channel 33, thereby sweeping the compacted catalyst out of the channel and into the lower part of the pump chamber where it is maintained in fluidized condition until withdrawn from the outlet 42. Automatic catalyst flow control may be achieved by means of a float, not shown, supported in the dense catalyst phase within the pump chamber and connected to the arm 41 so that the aeration gas supplied to channel 33 is cut off as the float rises with the level of the catalyst body 43.

Various modifications of my catalyst pump may be employed without departing from the basic principles thereof. Thus, instead of employing stationary induction pipe 12, I may substitute a stationary helical feeder impelling catalyst downward by the rotation of the impeller 8. The drawings describing cross-sectional bowl designs are strictly schematic and, in general, I prefer that the area of a co-axial cylindrical section of the bowl increase gradually toward the periphery in order to facilitate the flow of compacted solids therethru. An increase of 2 to 25 per cent in the cylindrical cross-sectional area per foot of radius from the center to the periphery is satisfactory.

In case the amount of gas employed for refluidizing the catalyst at the periphery of the bowl be greater than that required for expelling the catalyst from the pump body into the outlet line, excess gas may be withdrawn thru a suitable excess-pressure valve, for example valve 44 in Figure 3.

The design of Figure 4 employing no outside air pressure for reaerating the catalyst has the advantage of reduced air requirement over the other designs shown. Various modifications of the internal fan principle may be employed, for example, the plate 36 may be fixed to the bowl with blades 35 constituting a permanent fan arrangement having a central gas inlet thru plate 36 which may be controlled by a cover plate actuated by arm 41 to allow more or less air to enter the suction of the fan.

In any of the designs, the speed of rotation of the bowl is suitably about 500 to 4000 R. P. M., although higher speeds may be used. Because of the relatively high density of the compacted solids in the bowl, it is not necessary to employ such high speeds as in the case of aerated solids. Thus, the density of the solids when compact will usually lie between 1 and 2 with metal oxides, clays, etc. The speed of rotation should be sufficient to provide centrifugal pressure in excess of the back pressure acting on the bowl at the periphery.

Erosion of the bowl is not serious because of a relatively small rate of motion of the compacted catalyst therethru. The bowl 28 is preferably constructed with radial or spiral vanes 45 to assist in imparting to the catalyst the required angular velocity. Smooth operation is facilitated by supplying, thru the catalyst induction tube 12, sufficient excess of fluidized solids over the requirement of the pump to provide a reverse flow of fluidized solids thru the annular space 46 between the induction tube 12 and the hollow shaft 9, the rejected fluidized solids feed being collected by means not shown and recharged to the pump.

A suitable dense fluidized solids phase for use in this pump may have a density of about 15 to 75 pounds per cubic foot. In the case of hydrocarbon conversion catalysts such as Super Filtrol, powdered silica-alumina, etc., having a particle size of about 20 to 300 microns, corresponding roughly to 50 to 400 mesh, the density of the fluidized suspension may be about 25 to 40 pounds per cubic foot. The deaerated solids in this case have a density of 55 pounds per cubic foot and upwards, e. g. 60 to 100 pounds per cubic foot. The deaerated or compacted condition of fine solids is also characterized by a rigid or semi-rigid structure which fails to flow freely under the influence of gravity.

Where it is desired to pump heavier substances such as fluidized iron catalyst, considerably higher densities will be encountered, requiring a much smaller centrifugal bowl for operating against the same pressure. The pumping of fluidized iron and fluidized cobalt catalysts is sometimes required in the monoxide process (Fischer process) where carbon monoxide and hydrogen are converted into liquid hydrocarbons by contact with these catalysts in fluidized solid form.

In the cracking of oils such as gas oil, where the catalyst must be frequently regenerated by recycling thru a reactor and regenerator system, the repeated handling of the catalyst results in more or less breakdown of the particles by attrition. High attrition rates result in loss of fines and impose the requirement of special recovery means, such as electrical precipitators. By the use of my catalyst pump, recycling of catalyst can be maintained in such systems with a minimum of attrition and a substantial pressure differential can be maintained between the reactor and the regenerator.

Having thus described my invention, what I claim is:

1. An apparatus for transferring finely divided solids from a low pressure supply of fluidized solids to a zone of higher pressure which comprises rotatable means positioned within said zone of higher pressure for rotating a compacted mass of said solids, a conduit leading from said supply to the center of rotation of said mass for conducting aerated fluidized solids thereto, an opening at the periphery of said rotatable means for discharging solids from said mass, peripheral baffle means associated with said opening for retaining a body of compacted solids against said opening to prevent movement of solids thru said opening during rotation of said rotatable means, and means for introducing an aerating gas into said body to control the flow of solids from said rotating mass thru said opening by fluidization of the solids in said body obstructing said opening.

2. A fluidized solids pump comprising a gas-tight housing, an outlet for solids at a low point therein, a rotatable hollow impeller member within said housing at the upper part thereof, a hollow shaft extending thru the wall of said housing and connecting with said impeller member, means for supplying powdered solids thru said shaft to the interior of said impeller member, an opening near the periphery of said impeller member leading outwardly in a radial direction from the interior thereof, a baffle opposite said opening and radially outward therefrom providing sufficient peripheral support to maintain a body of compacted solids against said opening and prevent flow of solids therethru while said impeller member is rotating at substantial speed, and controllable means for introducing an aerating gas into said body of compacted solids to fluidize them and thereby permit solids to pass from the interior of said impeller member thru said opening into said housing.

3. The apparatus of claim 2 wherein said impeller is circular in form and said baffle is comprised of a channel at the periphery thereof.

4. The apparatus of claim 2 wherein said impeller is a radially positioned tube and said baffle is formed by a return bend at the outer end of said tube.

5. The apparatus of claim 2 wherein the area of a co-axial cylindrical section thru said impeller member increases from the center to the periphery at the rate of about 2 to 25 per cent per foot of radius.

6. The apparatus of claim 1 wherein the means for introducing an aerating gas into the said body comprises a jet positioned to direct a high velocity stream of aeration gas against the surface of said solids, and means for supplying aeration gas under pressure to said jet.

7. The apparatus of claim 1 wherein the means for introducing an aerating gas into said body comprises a plurality of radial fins fixed to the bottom of said rotatable means, and an annular baffle plate spaced below the bottom of said rotatable means, the periphery of said annular baffle plate terminating adjacent said peripheral baffle means.

VANDERVEER VOORHEES.

REFERENCES CITED

The following references are of record in the file of this patent:

UNITED STATES PATENTS

| Number | Name | Date |
|---|---|---|
| 1,937,040 | Vogel-Jorgensen | Nov. 28, 1933 |
| 2,360,464 | Arveson | Oct. 17, 1944 |